United States Patent [19]
Liu

[11] Patent Number: 5,362,068
[45] Date of Patent: Nov. 8, 1994

[54] GAME CARTRIDGE FOR A TELEVISION GAME CONSOLE

[76] Inventor: Houng-Yean Liu, No. 193, Yung-Mei Rd., Yang-Mei Chen, Tao-Yuan Hsien, Taiwan, Prov. of China

[21] Appl. No.: 42,694

[22] Filed: Apr. 5, 1993

[51] Int. Cl.⁵ ............................................. G06F 9/00
[52] U.S. Cl. ................................ 273/435; 273/148 B; 273/434; 364/410
[58] Field of Search ............... 273/85 G, 85 CP, 435, 273/148 B, 434; 364/410, DIG. 2; 365/52

[56] References Cited

U.S. PATENT DOCUMENTS

| | | | |
|---|---|---|---|
| 4,386,773 | 6/1983 | Bronstein | 273/435 |
| 4,432,067 | 2/1984 | Nielsen | 364/410 X |
| 4,485,457 | 11/1984 | Balaska et al. | 364/900 |
| 5,112,051 | 5/1992 | Darling et al. | 273/148 B |

FOREIGN PATENT DOCUMENTS

| | | | |
|---|---|---|---|
| 0431723 | 6/1991 | European Pat. Off. | 273/435 |
| 0234286 | 11/1985 | Japan | 365/52 |
| 4-303488 | 10/1992 | Japan | 273/435 |

*Primary Examiner*—Vincent Millin
*Assistant Examiner*—Kerry Owens
*Attorney, Agent, or Firm*—Harness, Dickey & Pierce

[57] ABSTRACT

A game cartridge includes a main cartridge which has a primary graphics memory unit, a first edge-board contact that is connected removably to a television game console and that enables the television game console to address and receive data from different storage locations in the primary graphics memory unit, and an edge-board connector that is connected electrically to the primary graphics memory unit and to the first edge-board contact. An auxiliary card has a secondary graphics memory unit and a second edge-board contact that is connected removably to the edge-board connector. A logic select circuit detects an address input from the television game console corresponding to a predetermined one of the storage locations in the primary graphics memory unit. The logic select circuit disables the primary graphics memory unit and enables the secondary graphics memory unit upon detection of the address input to permit the secondary graphics memory unit to replace the predetermined one of the storage locations in the primary graphics memory unit when the auxiliary card is attached to the main cartridge.

6 Claims, 5 Drawing Sheets

— 5,362,068 —

GAME CARTRIDGE FOR A TELEVISION GAME CONSOLE

BACKGROUND OF THE INVENTION

1. Field of the Invention

The invention relates to a television game console, more particularly to an improved game cartridge for a television game console.

2. Description of the Related Art

Referring to FIG. 1, a conventional television game console is shown to comprise a central processor unit (CPU) (10), a visual display unit (VDU) (11), a user interactive control unit (12), and an internal memory unit (13). Advancements in the field of integrated circuit technology have made it possible employ a single CPU (10) instead of the CPU and the peripheral processor unit (PPU) used in older The internal memory unit (13) is a static random access serves as an external memory unit, is connected to the television game console.

Referring to FIG. 2, a conventional game cartridge (14) comprises a casing (140) and a printed circuit board (PCB) (141) mounted inside the casing (140). A program memory unit (142) and a graphics memory unit (143) are mounted on the PCB (141). The PCB (141) further provided with 60 edge-board contacts (144) which serve to connect electrically the game cartridge (14) and the CPU (10). The program memory unit (142) contains the characteristics of the game, such as the order and duration of particular events, the time when a particular playing unit or background scenery should appear, and the movement of the playing units. The graphics memory unit (143) is divided into different storage locations, each containing background music information or data corresponding to the bit patterns that make up a particular playing unit or background scenery. For example, data in first and second storage locations of the graphics memory unit (143) may contain the bit pattern of . the face or whole body of a respective one of two playing units. When the CPU (10) is activated to start the game, the CPU (10) receives commands from the internal memory unit (13), thereby enabling the former to gather program data from the program memory unit (142). Based on data from the program memory unit (142), the CPU (10) retrieves the faces or whole bodies of the playing units from the graphics memory unit (143) so as to show the same on the VDU (11). The program data in the program memory unit (142) is used to control the positions of the playing units, the times when the playing units should appear, and the movement of the playing units. The CPU (10) is further provided with a graphic data processing network which converts data from the graphics memory unit (143) into a radio frequency signal that is sent to the VDU (11). The control unit (12), such as a keyboard, a joystick or a computer mouse, enables the user to react and influence events during the course of the game. This illustrates how a conventional television game console operates.

A main drawback of the conventional game cartridge (14) is that the data in the graphics memory unit (143) is stored beforehand and cannot be changed when desired. Thus, the appearance of the playing units cannot be changed so as to resemble the user and/or his friends.

SUMMARY OF THE INVENTION

Therefore, the objective of the present invention is to provide an improved game cartridge for a television game console which permits changes in the background music and/or in the appearance of the playing units and the background scenery without changing the game parameters or the rules of the game, thereby enhancing the user appeal of the game cartridge.

Accordingly, the game cartridge of the present invention is to be used with a television game console and comprises:

a main cartridge which has a program memory unit, a primary graphics memory unit and a first edge-board contact means connected electrically to the program memory unit and to the primary graphics memory unit, said first edge-board contact means being connected removably to the television game console and enabling the television game console to address and receive data from the program memory unit and from different storage locations in the primary graphics memory unit;

an edge-board connector provided on the main cartridge and connected electrically to the primary graphics memory unit and the first edge-board contact means;

an auxiliary card having a secondary graphics memory unit and a second edge-board contact means connected electrically to the secondary graphics memory unit, said second edge-board contact means being connected removably to the edge-board connector; and a logic select circuit means for detecting an address input from the television game console corresponding to a predetermined one of the storage locations in the primary graphics memory unit, said logic select circuit means disabling the primary graphics memory unit and enabling the secondary graphics memory unit upon detection of the address input to permit the secondary graphics memory unit to replace the predetermined one of the storage locations in the primary graphics memory unit when the auxiliary card is attached to the main cartridge.

Data in the secondary graphics memory unit may be new background music information or data corresponding to the bit patterns that make up a new playing unit or background scenery.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
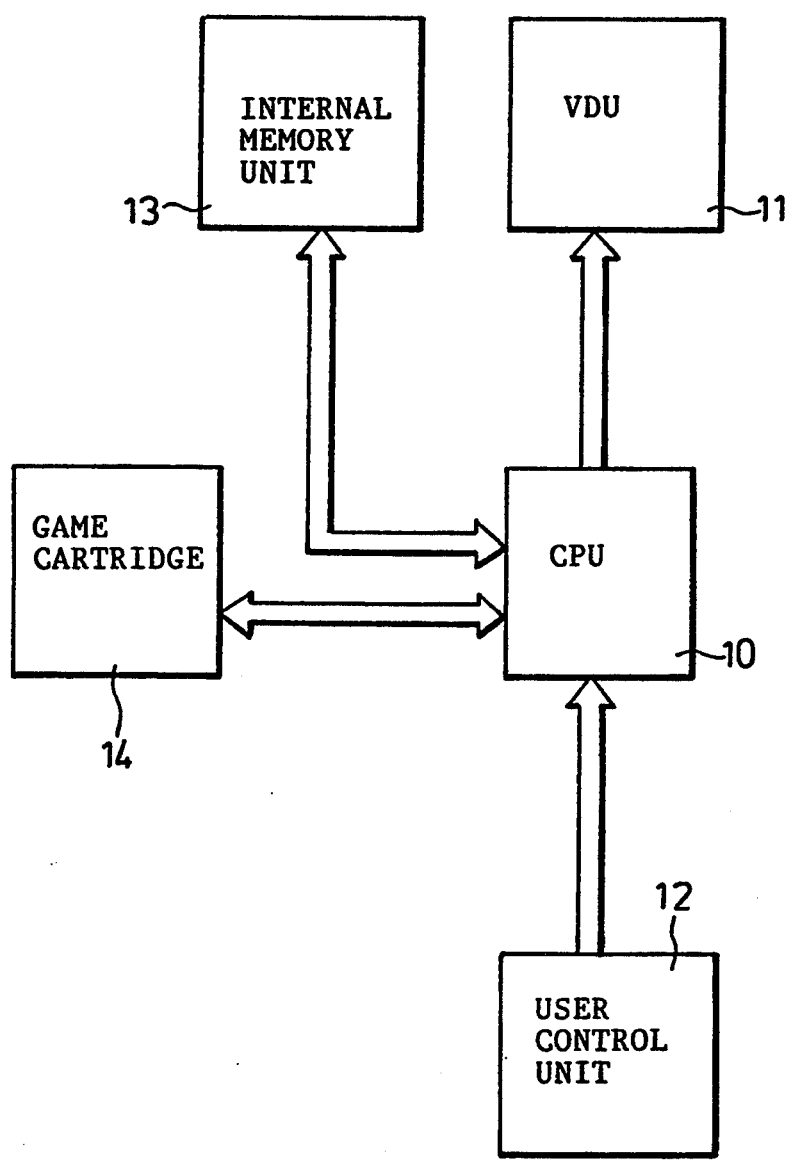
FIG. 1 is a schematic block diagram of a conventional television game console.
Figure 2:
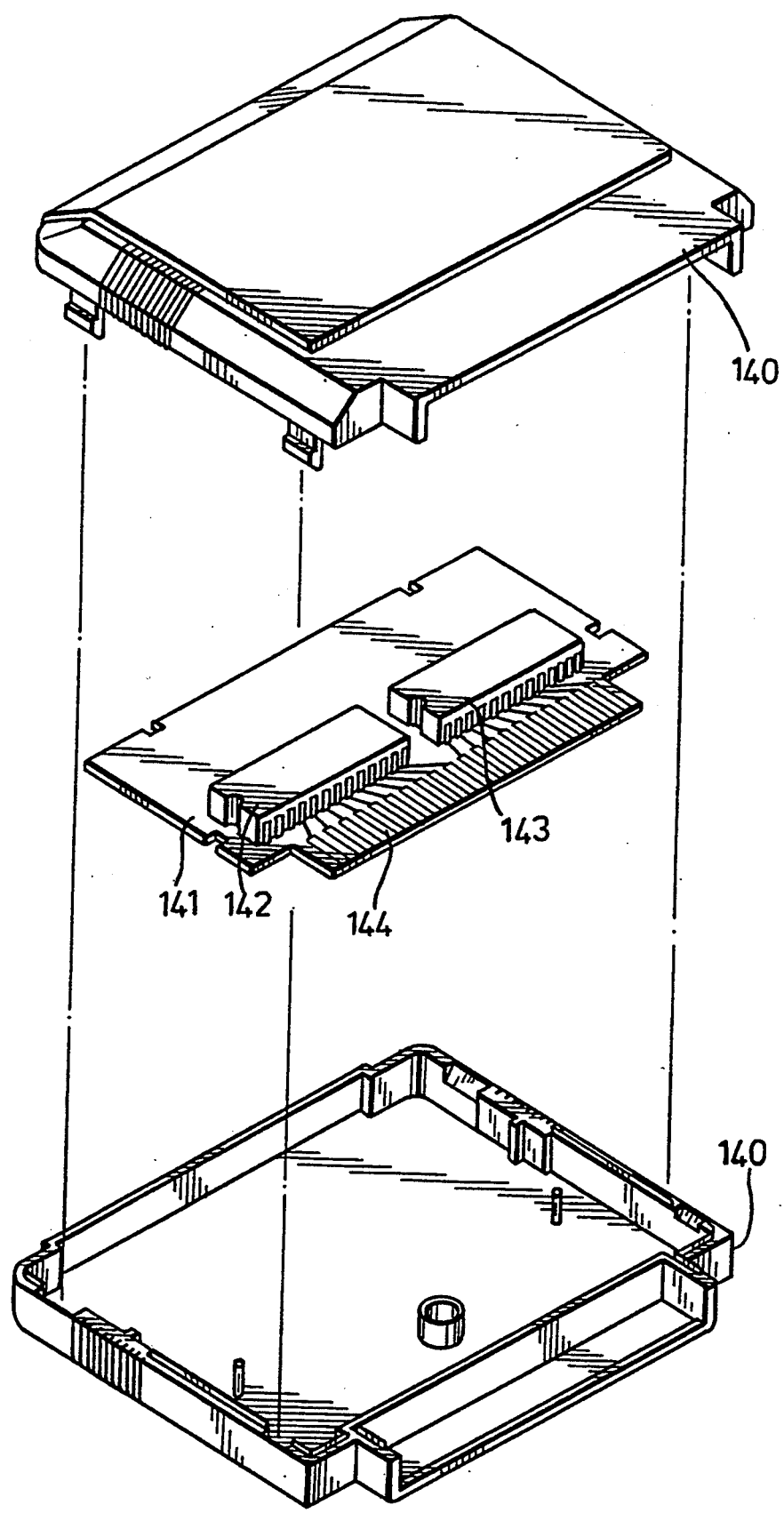
FIG. 2 is an exploded view of a conventional game cartridge for a television game console.
Figure 3:
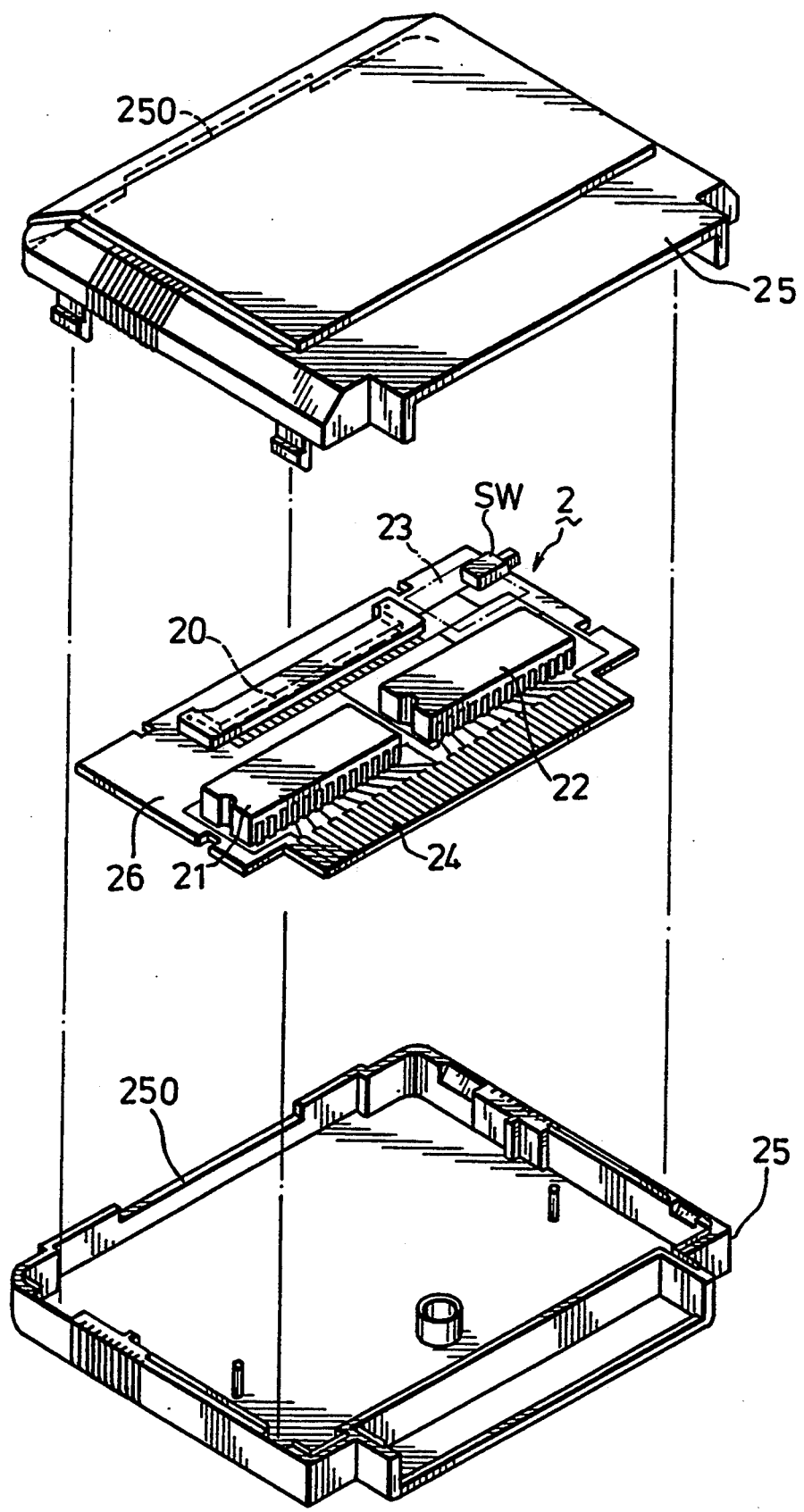
FIG. 3 is an exploded view of a main cartridge of the preferred embodiment of a game cartridge according to the present invention.
Figure 4:
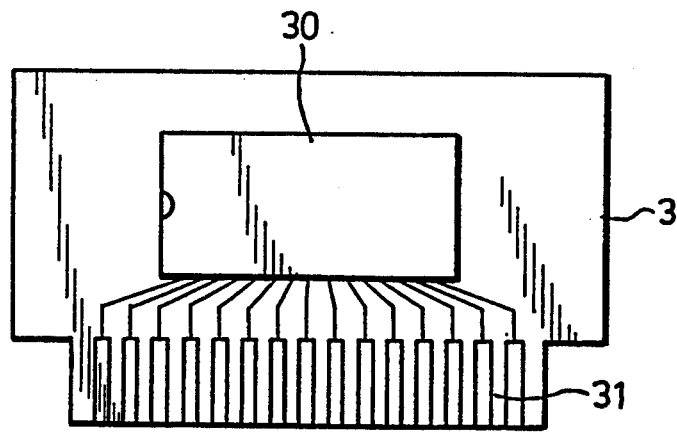
FIG. 4 is a schematic view illustrating a printed circuit board of an auxiliary card of the preferred embodiment.
Figure 5:
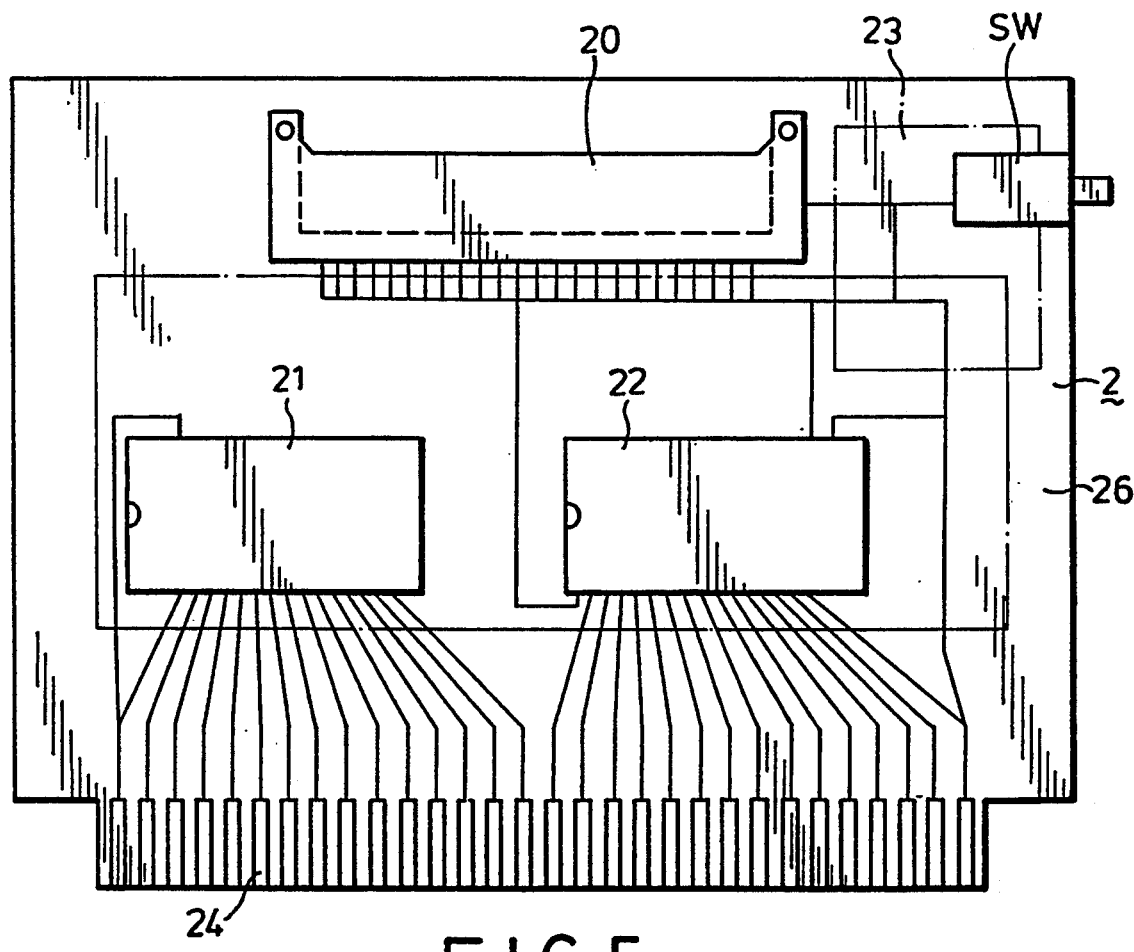
FIG. 5 is a schematic view illustrating a printed circuit board of the main cartridge of the preferred embodiment.

The improved game cartridge of the present invention is adapted for use with a conventional television game console and comprises a main cartridge (2) and an auxiliary card (3). Referring to FIG. 3, the main cartridge (2) comprises a casing (25) and a printed circuit board (PCB) (26) mounted inside the casing (25). Referring to FIG. 5, the PCB (26) is provided with an edge-board connector (20) which is similar to that installed in a conventional television game console. A program memory unit (21) and a primary graphics memory unit (22) are mounted on the PCB (26). The PCB (26) is further provided with 60 edge-board contacts (24) which serve to connect electrically the main cartridge (2) and the television game console. Referring once more to FIG. 3, the casing (25) is provided with an opening (250) to access the edge-board connector (20). Referring to FIG. 4, the auxiliary card (3) has a secondary graphics memory unit (30) and 60 edge-board contacts (31). The edge-board contacts (31) of the auxiliary card (3) are extended into the opening (250) so as to connect electrically with the main cartridge (2) via the edge-board connector (20).

Figure 6:
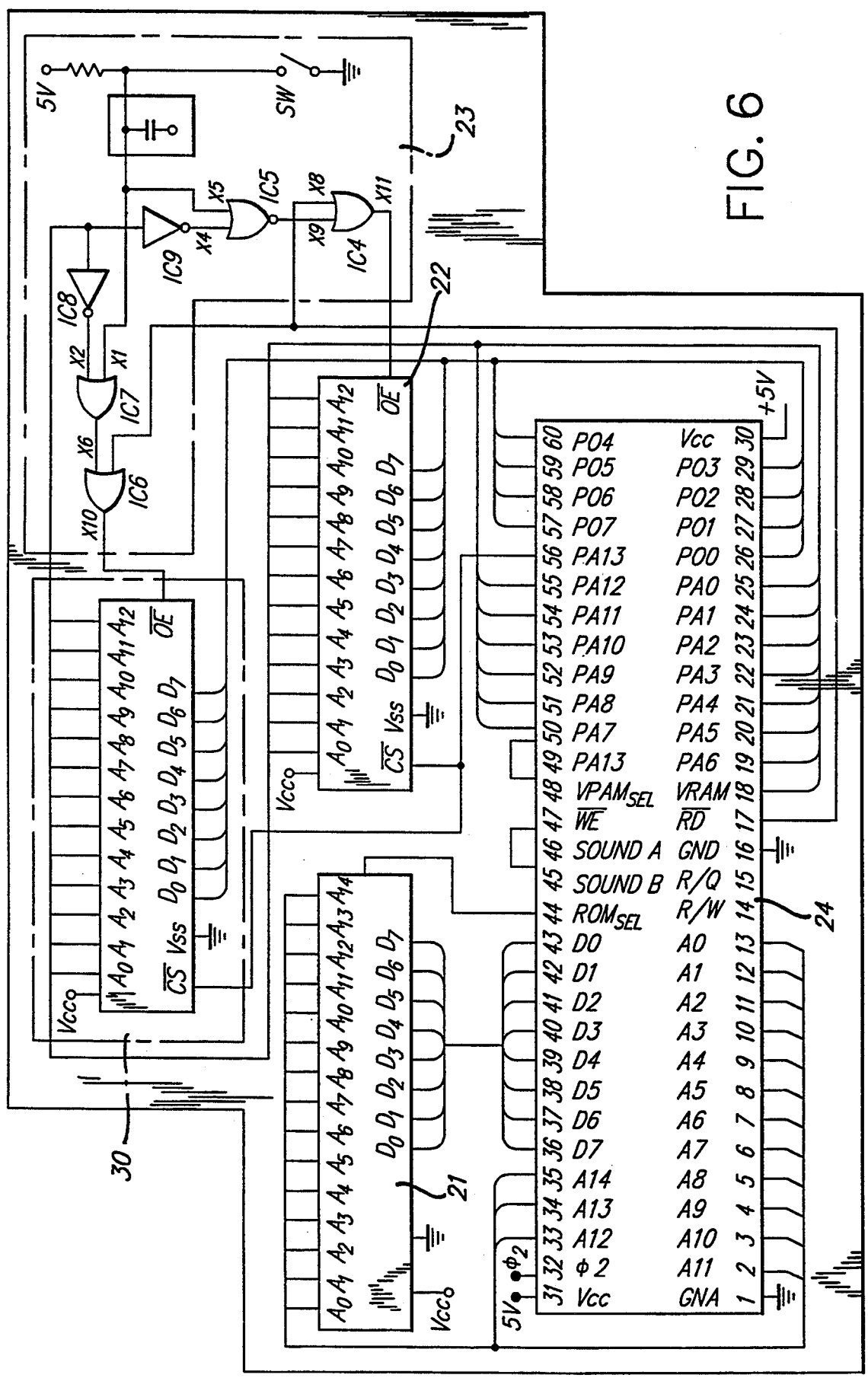
FIG. 6 is a schematic electrical circuit diagram of the game cartridge of the present invention.

FIG. 6 is a schematic electrical circuit diagram of the preferred embodiment when the auxiliary card (3) is connected to the main cartridge (2). The program memory unit (21) and the primary graphics memory unit (22) of the main cartridge (2) are similar to those installed in conventional game cartridges. That is, the program memory unit (21) contains the characteristics of the game, while the primary graphics memory unit (22) is divided into different storage locations, each containing background music information or data corresponding to the bit patterns that make up a particular playing unit or background scenery.

The primary and secondary graphics memory unit (22, 30) are connected to a logic select circuit (23), which is provided on the PCB (26), when the edge-board contacts (31) of the auxiliary card (3) are connected to the edge-board connector (20) of the main cartridge (2). The address bus lines (A0-A12), the data bus lines (D0-D8), and the chip select line (/CS) of the secondary graphics memory unit (30) are connected respectively to the address lines (A0-A12), the data bus lines (D0-DS) and the chip select line (/CS) of the primary graphics memory unit (22). The logic select circuit (23) includes a NOT gate (ICS) which has an input terminal (X3) that is connected to the address line (A12) of the primary and secondary graphics memory unit (22, 30). The Output enable (/OE) pin of the secondary graphics memory unit (30) is connected to the output terminal (X10) of an OR gate (IC6) of the logic select circuit (23).

A manually operated switch (SW) of the logic select circuit (23) is opened if the auxiliary card (3) is not attached to the main cartridge (2) when the main cartridge (2) is connected to the television game console. One of the input terminals (X5) of a NOR gate (IC5) is at a high logic state, thereby resulting in a low logic signal at the output terminal (X9) of the NOR gate (IC5). The low-logic signal from the NOR gate (IC5) and the read signal at pin 17 of the edge-board contacts (24) are received by an OR gate (IC4), thereby permitting the latter to enable the primary graphics memory unit (22). The address range 0000-1FFF of the primary graphics memory unit (22) can be accessed at this stage.

The manually operated switch (SW) of the logic select circuit (23) is closed when the auxiliary card (3) is attached to the main cartridge (2), thereby generating a low logic signal at the input terminal (X5) of the NOR gate (IC5). The address line A12 is at a low logic state when the television game console wishes to access data within the address range 0000-0FFF. The output terminal (X4) of a NOT gate (IC9) is at a high logic state, thereby resulting in a low logic signal at the output terminal (X9) of the NOR gate (IC5). A low logic signal is generated at the output terminal (X11) of the OR gate (IC4), thereby enabling the primary graphics memory unit (22) when the television game console wishes to access the address range 0000-0FFF.

The address line A12 is at a high logic state when the television game console wishes to access data within the address range 1000-1FFF. The output terminal (X4) of the NOT gate (IC9) is at a low logic state, thereby resulting in a high logic signal at the output terminal (X9) of the NOR gate (IC5). The high logic signal from the NOR gate (IC5) disables the primary graphics memory unit (22). At the same time, the output terminal (X2) of the NOT gate (ICS) is at a low logic state, thereby resulting in a low logic signal at the output terminal (X6) of an OR gate (IC7). The low logic signal from the OR gate (IC7) and the read signal at pin 17 of the edge-board contacts (24) are received by the OR gate (IC6), thereby permitting the latter to enable the secondary graphics memory unit (30) when the television game console wishes to access the address range 1000-1FFF.

In summary, the operation of the preferred embodiment is as follows:

1. When the auxiliary card (3) is not attached to the main cartridge (3), data within the address range 0000-1FFF of the primary graphics memory unit (22) can be accessed by the television game console.

2. When the auxiliary card is attached to the main cartridge (3), the primary graphics memory unit (22) is enabled when data within the address range 0000-0FFF is to be accessed by the television game console. The secondary graphics memory unit (30) is disabled at this stage.

3. The primary graphics memory unit (22) is disabled and the secondary graphics memory unit (30) is enabled when data within the address range 1000-1FFF is to be accessed by the television game console.

It has thus been shown that the secondary graphics memory unit (30) can be used to replace predetermined storage locations of the primary graphics memory unit (22), thereby permitting changes in the background music and/or in the appearance of playing units and the background scenery without affecting the game parameters or the rules of the game.

Recent advancements in the field of electronics have made it possible to translate a subject photograph into digital computer signals. These digital computer signals are received by a memory programmer which, in turn, stores the computer signals in a memory unit. In the above embodiment, the digital computer signals are stored in the address range 1000-1FFF of the secondary graphics memory unit (30). This illustrates how the appearance of the playing units can be changed so as to resemble the user and/or his friends.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A game cartridge for a television game console, said game cartridge including a main cartridge which has a program memory unit, a primary graphics memory unit and a first edge-board contact means connected electrically to said program memory unit and to said primary graphics memory unit, said first edge-board contact means being connected removably to said television game console and enabling said television game console to address and receive data from said program memory unit and from different storage locations in said primary graphics memory unit, wherein the improvement comprises:

an edge-board connector provided on said main cartridge and connected electrically to said primary graphics memory unit and said first edge-board contact means;

an auxiliary card having a secondary graphics memory unit and a second edge-board contact means connected electrically to said secondary graphics memory unit, said second edge-board contact means being connected removably to said edge-board connector; and a logic select circuit means for detecting an address input from said television game console corresponding to a predetermined one of said storage locations in said primary graphics memory unit, said logic select circuit means also being operable to disable said primary graphics memory unit and enable said secondary graphics memory unit upon detection of said address input to permit said secondary graphics memory unit to replace said predetermined one of said storage locations in said primary graphics memory unit when said auxiliary card is attached to said main cartridge.

2. The game cartridge as claimed in claim 1, wherein said secondary graphic memory unit contains new background music information to replace old background music information stored in said predetermined one of said storage locations in said primary graphics memory unit.

3. The game cartridge as claimed in claim 1, wherein said secondary graphic memory unit contains data corresponding to bit patterns which make up a new playing unit to replace data that is stored in said predetermined one of said storage locations in said primary graphics memory unit and that corresponds to bit patterns which make up an old playing unit.

4. The game cartridge as claimed in claim 1, wherein said secondary graphic memory unit contains data corresponding to bit patterns which make up a new background scenery to replace data that is stored in said predetermined one of said storage locations in said primary graphics memory unit and that corresponds to bit patterns which make up an old background scenery.

5. The game cartridge as claimed in claim 1, wherein said main cartridge includes a casing and a printed circuit board provided inside said casing; said edge-board connector, said program memory unit and said primary graphics memory unit being provided on said printed circuit board; said casing being formed with an opening adjacent to said edge-board connector to permit extension of said second edge-board contact means into said edge-board connector.

6. The game cartridge as claimed in claim 5, wherein said logic select circuit means is provided on said printed circuit board.

* * * * *

UNITED STATES PATENT AND TRADEMARK OFFICE
CERTIFICATE OF CORRECTION

PATENT NO. : 5,362,068
DATED : November 8, 1994
INVENTOR(S) : Houng-Yean Liu

It is certified that error appears in the above-identified patent and that said Letters Patent is hereby corrected as shown below:

Column 1, line 16, after "possible" insert --to--.

Column 1, line 18, after "older" insert --models.--.

Column 1, line 19, after "access" insert --memory (SRAM) device. A game cartridge (14), which--.

Column 1, line 25, after "(141)" (second occurrence), insert --is--.

Column 1, line 39, delete ".".

Column 3, line 41, "(D0-DS)" should be --(D0-D8)--.

Column 3, line 43, "(ICS)" should be --(IC8)--.

Column 3, line 46, "Output" should be --output--.

Column 4, line 17, "(ICS)" should be --(IC8)--.

Signed and Sealed this

Seventh Day of February, 1995

Attest:

BRUCE LEHMAN

Attesting Officer

Commissioner of Patents and Trademarks